July 27, 1954 B. H. THOMPSON 2,684,997

TELEPHONE LINE FINDER CIRCUIT

Filed Nov. 15, 1951 2 Sheets-Sheet 1

INVENTOR
BERT H. THOMPSON

BY John E. Cassidy
ATTORNEY

July 27, 1954 B. H. THOMPSON 2,684,997

TELEPHONE LINE FINDER CIRCUIT

Filed Nov. 15, 1951 2 Sheets-Sheet 2

INVENTOR
BERT H. THOMPSON

BY John E. Cassidy
ATTORNEY

Patented July 27, 1954

2,684,997

UNITED STATES PATENT OFFICE 2,684,997

TELEPHONE LINE FINDER CIRCUIT

Bert H. Thompson, Glendale, Calif., assignor to American Telephone and Telegraph Company, a corporation of New York Application November 15, 1951, Serial No. 256,547

5 Claims. (Cl. 179—6.5)

Figure 1:
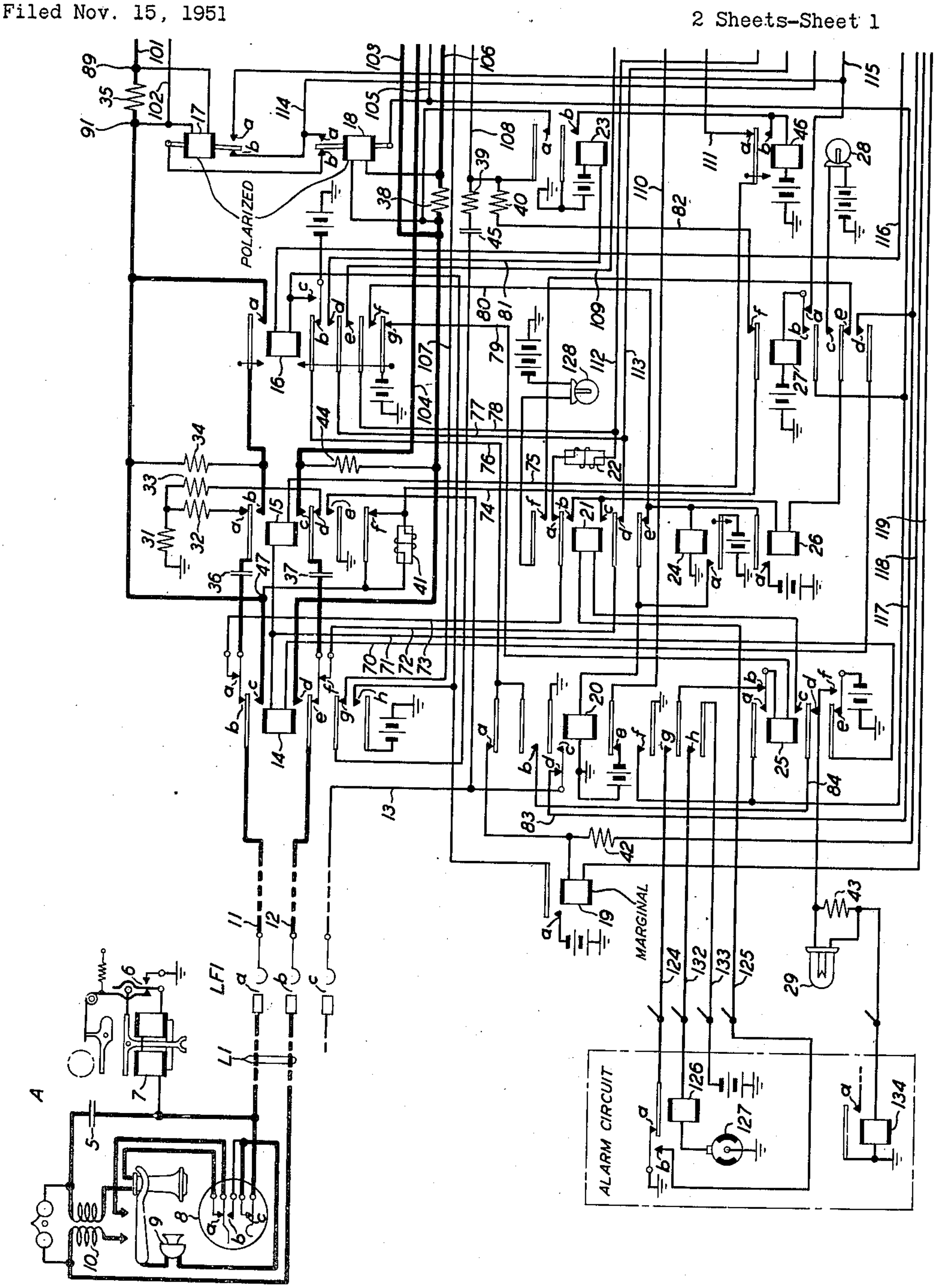

This invention relates to telephone systems and particularly to automatic telephone systems havtems having coin-controlled lines.

The object of the invention is to minimize double connections and loss of revenue on coin-controlled lines in an automatic telephone system.

Coin-controlled lines in automatic telephone systems are well known. An example of such a line widely employed in a large telephone system is that described in Patent 1,569,623 granted to B. G. Dunham, January 12, 1926 and another is that described in Patent 2,427,000 granted to H. Hovland, September 9, 1947. Such lines and others are subject to double connections and loss of revenue which the present invention is designed to prevent.

The invention and its features may be understood by considering a system in which the invention is presently embodied, one such system being shown in the accompanying drawing and described in detail hereinafter. It is to be understood, however, that the invention is not limited in its application to the specific system disclosed herein but is generally applicable to automatic systems comprising coin stations.

Figure 2:
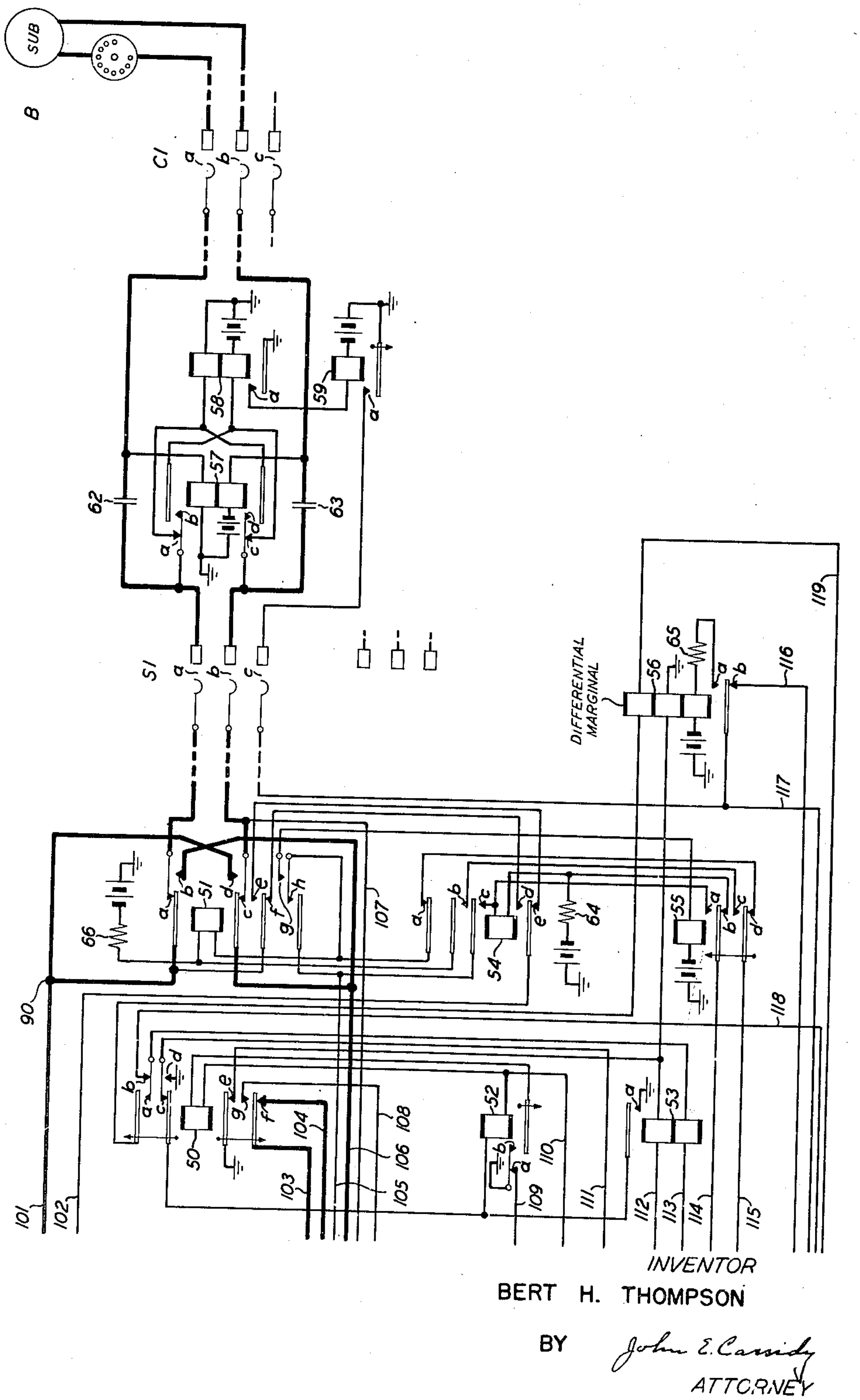

In the drawings:

Fig. 1 shows a subscriber telephone station, equipped with a coin control, connected through a conventional line finder indicated by the line finder convention to the left-hand portion of a coin trunk; and Fig. 2 shows the right-hand portion of the coin trunk which is connected through a selector, indicated by the selector convention, and a connector to a subscriber telephone station.

The invention is illustrated in an automatic telephone system in which switches of the step-by-step type are used for extending connections between calling and called subscribers' lines. Reference may be had to pages 53 to 65 of the second edition of Automatic Telephony by Smith and Campbell for a description of the structure and operation of step-by-step selector and connector switches; and reference may be had to the patent to R. L. Stokely, No. 1,799,654, granted April 7, 1931 for a description of a line finder switch of the step-by-step type.

The subscribers' stations A and B are of the type usually provided with a coin-control mechanism comprising the coin actuated contact and the coin collect and refund magnet. Reference may be had to the patent to O. F. Forsberg, No. 1,043,219 of November 5, 1912 for a description of a pre-pay coin box.

*Originating a call*

The manner in which the system disclosed in the drawings functions when a call is originated at station A will now be described. In the following description of the functioning of the system, it is assumed that the positive side of the central office battery is grounded. Therefore, wherever the word battery is used, it in fact denotes the negative side of the battery; and where the word ground is used, the positive side of the battery is meant.

When the receiver at station A is removed from normal position, a line finder LF1 is operated in a manner described in the aforementioned patent to R. L. Stokely to connect the line L1 to the coin trunk. Upon connection of line L1 through the brushes of line finder switch LF1 to the coin trunk, a circuit is established to operate relay 53 in Fig. 2. The circuit may be traced from negative battery through contact 16*b*, conductor 76, contact 20*a*, resistance 42, conductor 118, contact 50*b*, bottom winding of relay 53, conductor 113, contact 21*d*, conductor 72, contact 14*f*, contact 14*e*, conductor 12, contact LF1*b*, lower loop conductor of loop L1, left-hand coil of inductance 10, left-hand receiver hook contact, transmitter 9, dial contact 8*c*, upper loop conductor of loop L1, contact LF1*a*, conductor 11, contact 14*b*, contact 14*a*, conductor 73, contact 21*a*, inductance coil 22, conductor 112, top winding of relay 53 and contact 50*e* to ground operating relay 53. The operation of relay 53 closes a circuit from ground through contact 53*a*, winding of relay 52, conductor 110 and contact 20*e* to battery operating relay 52 and establishes also a parallel circuit through contact 50*c*, conductor 111, contact 46*a*, winding of relay 15, conductor 71 and contact 25*e* to battery operating relay 15. The operation of relay 15 by opening contact 15*f* opens a short circuit around inductance coil 41. The operation of relay 15 connects ground through contact 15*e* and conductor 13 to the line finder sleeve circuit to hold the line finder in a well-known manner. The operation of relay 52 establishes a circuit extending from ground through contact 52*b*, winding of relay 50, conductor 110 and contact 20*e* to battery operating relay 50. The operation of relay 50 closes a circuit to selector S1. The circuit may be traced from the tip conductor of selector S1 through contact 51*a*, conductor 101, resistance 35 and the winding of polar relay 17 in parallel, junction 47, inductance coil 41, conductor 74, contact 27*f*, conductor 82, resistance 40, conductor 108, contact 50*g*, conductor 103, resistance 38 in parallel with the winding of polar relay 18, conductor 106, and contact 51c to the ring conductor of selector S1. This establishes a bridge across the tip and ring conductors of selector S1 and actuates the line relay, not shown, in the selector in a well-known manner. The circuit was shown to extend through the windings of polar relays 17 and 18. When the circuit is idle the armatures of polar relays 17 and 18 are spring biased to the positions shown in Fig. 1. They are arranged so that the armature of one or the other of them is actuated to its opposite contact in response to current of a particular polarity. In response to the polarity of current impressed on them for the present condition the armature of relay 18 is actuated to engage contact 18a and the armature of relay 17 remains in engagement with contact 17b due to its spring tension. The operation of relay 50 provides a holding ground circuit for relay 15 at contact 50d which replaces ground at contact 53a when contact 50c opens. The operation of relay 50 by opening contact 50b and closing contact 50a also changes the circuit, heretofore traced, which supplied battery to the ring conductor 12 through resistance 42, so that the battery is now supplied to the ring conductor 12 from the same source at contact 16b through contact 20a, winding of relay 19, conductor 119, top winding of differential marginal relay 56, contact 50a and the bottom winding of relay 53 to conductor 113 which has been shown to connect to ring conductor 12. The operation of relay 50, by opening contact 50e disconnects ground from the right-hand terminal of the upper winding of relay 53 and ground through the middle winding of relay 56 is substituted therefor. Relay 53 is maintained operated but relay 56 which responds only to a heavier than normal ground does not operate at this time. The operation of the selector relay as a result of the connection of the bridge across the tip and ring conductors of the selector also connects ground, not shown, to the selector S1 sleeve connection and through conductor 117, contact 20d and conductor 13 to supplement the line finder sleeve holding circuit. In response to the connection of the bridge across the tip and ring conductors of the selector the selector impresses dial tone on a circuit which extends from the tip of the selector S1 through contact 51a, conductor 101, resistance 35 and the winding of relay 17 in parallel, resistance 34, contact 15b, condenser 36, contact 14b, conductor 11, LF1 contact *a*, upper loop conductor, condenser 5, right-hand coil of inductance 10, winding of the receiver, dial contact 8a, right-hand and left-hand contacts of the receiver hook, left-hand inductance coil, lower loop conductor, LF1 contact *b*, conductor 12, contact 14e, condenser 37, contact 15c, resistance 44, resistance 38 in parallel with winding of relay 18, conductor 106 and contact 51c to the ring of selector S1. The tone thereby produced in the receiver is a signal to the subscriber to deposit a coin.

*Coin deposited*

The ring of the loop, as has been shown, connects to battery and the tip connects to ground. When a coin is deposited in the coin control device, contact 6 is closed which establishes a path to ground through the winding of coin control magnet 7 in parallel with the path to ground through the tip conductor. The ring conductor path to battery has been shown to extend through the winding of relay 19 which is marginal and which is now operated since the resistance of the loop is now reduced by the parallel path to ground through contact 6. The operation of relay 19 establishes a circuit from battery through contact 19a, winding of relay 16, conductor 116 and contact 56b to ground, not shown, through the sleeve of the selector circuit and in parallel through conductor 117, contacts 20d and 15e to ground, operating relay 16 which locks to battery through contact 16c. Relay 16 operated establishes a circuit from battery through contact 16f to parallel paths, through the winding of relay 24 to ground and through contact 21e and the winding of relay 20 to ground operating relays 24 and 20. The operation of relay 16 also establishes a circuit from battery through the winding of relay 23, conductor 81, contact 16d, conductor 77, and contact 21d which extends to the ring of the loop, so that now the winding of relay 23 is in series with the ring of the loop, replacing the path from battery through contact 16b, the winding of relay 19 and the lower winding of relay 53 which path was opened at contact 16b when relay 16 operated. Relay 19 releases but relay 53 is held operated for a short interval notwithstanding the opening of the path through its lower winding, as its upper winding is still energized from the new battery source supplied around the loop through the winding of relay 23. The operation of relay 23 establishes a circuit from ground through contact 23b and the winding of relay 46 to battery operating relay 46. The operation of relay 23, at contact 23a, closes a shunt around a portion of the selector bridge circuit, which shunted portion includes conductor 108, contact 50g and conductor 103, so that the bridge will be maintained after relay 50 releases. Relay 46 operated, by opening contact 46a and closing contact 46b supplies ground from contact 23b to the winding of relay 15, to replace the ground supplied through contact 50d and conductor 111 after relay 50 releases, so as to maintain relay 15 operated after the release of relay 50. Relay 24 when operated supplies battery through contact 24a to take over control of relay 20 from relay 16 through contact 16f. When relay 20 operates relays 50 and 52 are released by opening contact 20e which supplied battery to relays 50 and 52 over conductor 110. The operation of relay 20 also separates the sleeves of the line finder and selector which were joined through contact 20d. By closing contact 20c, relay 20 connects ground to the sleeve conductor 13 of the line finder to supplement the ground from contact 15e. The release of relay 52 short-circuits the top winding of relay 53, releasing relay 53, by connecting ground through contact 52a, conductor 109, contact 16e, conductor 78 and conductor 112, to the left-hand terminal of the top winding of relay 53, the right-hand terminal of the top winding being also grounded. Relays 50 and 52 are slow in releasing in order to insure that relay 23 is fully operated before relay 50 releases and opens the bridge to the selector in case relay 53 releases when the coin is deposited.

The purpose of differential marginal relay 56 is to block the operation of the coin trunk in case of an irregular condition on the line. In response to such a condition relay 56 operates and prevents further operation of the trunk in the following manner.

When relay 56 operates, due to variations from the normal current conditions, which normal current conditions maintain the armature of the relay in engagement with its lower contact 56b, contact 56a is closed and relay 56 is locked in this position over a circuit from battery through the bottom winding of relay 56, resistance 65 and contact 56a to ground in the selector sleeve circuit. The function of resistance 65 is to prevent overheating of relay 56. In order for dialing to proceed, in a manner to be described, it is necessary for relay 16 to be operated in a manner heretofore explained over a path which extended through contact 56b. With contact 56b opened relay 16 cannot operate and, since dialing cannot proceed, a desired party cannot be connected through the coin trunk. The circuit will remain in this condition and it is necessary for the calling party to hang up his receiver, after the irregular condition is terminated, before a call can be successfully placed.

*Dialing*

The calling party now actuates calling dial 8 in a well-known manner, opening and closing contact 8c a certain number of times for each digit dialed corresponding to the number of the digit. In response to this the winding of relay 23, which is connected in series with the loop, as has been shown, is energized and deenergized and selector bridge contact 23a is opened and closed a corresponding number of times for each digit dialed to repeat the dialed pulses to the selector. Relay 46, controlled by relay 23, is released in response to the first opening of contact 23b and, since it is slow in operating, relay 46 remains released during the pulsing of each train of pulses after the first pulse of each train. Relay 15 is in turn controlled by relay 46, receiving its battery through contact 46b. Relay 15 is therefore released during the dialing of each train of pulses so as to minimize interference with the dialing by short-circuiting the inductance 41 at contact 15f.

The selector S1 is actuated vertically, in response to the reception of the first train of pulses corresponding to the first digit, a number of steps corresponding to the number of the digit and then automatically moves horizontally at the vertical level corresponding to the number of the first digit until it identifies an idle trunk or succeeding switch. It will be assumed that terminals S1 are thereby selected, extending the tip, ring and sleeve terminals of the selector through terminals S1a, S1b and S1c, the tip conductor and the top winding of relay 58 to ground. The ring conductor is extended through contact 57c, and the bottom winding of relay 58 to battery operating relay 58, which by closing contact 58a in turn operates relay 59. Relay 59 impresses holding ground potential through contact 59a, and selector contact S1c on the sleeve circuit of the coin trunk. The following two digits dialed by the calling party actuate repeater relay 23 of the coin trunk and are in turn impressed on relay 58 of the connector. In response to this the connector C1 is operated to select the called line. Connector C1 makes a busy test of the line and if the line is not busy impresses ringing current on the called line to call the called subscriber.

*Called party responds*

It will be assumed that connection has been established to the called line at SUB station B through connector terminals C1a, C1b and C1c and that the called party responds to the ringing by lifting his receiver which connects the loop tip and ring conductors together. This closes a circuit from battery through the lower winding of relay 57 around called subscriber B's loop and back through the top winding of relay 57 to ground operating relay 57. This opens contacts 57a and 57c and closes contacts 57b and 57d. Battery and ground which before the subscriber answered were connected through the middle and top conductors of the coin trunk respectively are now connected through the top and middle conductors respectively. This reverses the polarity of the current through the windings of relays 17 and 18. The armature of relay 17 is now actuated to engage its contact 17a in response to the changed direction of flow of current through its winding and simultaneously the armature of relay 18 is actuated due to its spring tension to engage its contact 18b. This establishes a circuit from ground through contact 20f, contact 18b and contact 17a to parallel branches. One branch extends through contact 27a and the winding of relay 27 to battery operating relay 27. The other branch extends through conductor 115, contact 55d, contact 54a, winding of relay 51 and resistance 66 to battery operating relay 51. Relay 27 locks through its contact 27b to ground through contact 20f. Relay 51 locks through its contact 51h and conductor 105 to the same ground on contact 20f. Relay 51 operated in turn operates relay 55 over a circuit from battery through the winding of relay 55, contact 51g, contact 51h, conductor 105, and contact 20f to ground. Relay 51 operated reverses the tip and ring conductors from the selector so that they are now connected to the ring and tip conductors respectively of the coin trunk through contacts 51b and 51d, instead of through contacts 51a and 51c as heretofore, to the tip and ring conductors respectively of the coin trunk. The operation of relay 51 also short-circuits the winding of relay 17 as well as resistance 35. The circuit may be traced from the bottom terminal of the winding of relay 17, and the right-hand terminal of resistance 35, at junction 89, through conductor 101, terminal 90, contact 51e, contact 54e and conductor 102 to junction 91 of the top terminal of the winding of relay 17, and left-hand terminal of resistance 35, shorting out resistance 35 and the winding of relay 17. The armature of relay 17 therefore disengages from contact 17a and is restored by spring tension to engage contact 17b. Due to the operation of relay 51 and the reversal of the battery connections on the tip and ring conductors, the armature of relay 18 now is actuated to engage its contact 18a. This establishes a circuit from battery through resistance 64, winding of relay 54, contact 55a, conductor 114, contact 18a and contact 20f to ground operating relay 54. Relay 54 operated locks through contact 54c, conductor 105 and contact 20f to ground. The operation of relay 54 removes the short circuit from around the winding of relay 17 by opening contact 54e, through which the short-circuiting path was traced. If due to an irregular operation at the called station, such as the actuation of the receiver switchhook or accidental actuation of the dial, relay 57 is released before relay 54 is operated, due to the reversal of the polarity of the battery caused thereby, as explained, the armature of relay 18 will be restored by its spring tension to engage contact 18b. Under this condition relay 54 will nevertheless be operated over the same operating path except that it extends through both contacts 17b and 18b to the same ground at contact 20f.

*Preparing to collect coin*

Relay 27 operated establishes a circuit from battery through contact 25e, conductor 71, winding of relay 14, conductor 70, contact 27d, conductor 117, contacts S1c and contact 59a to ground operating relay 14. The operation of relay 27 also prepares a circuit for collecting the deposited coin by closing positive coin control battery through lamp 28, contact 27c and the winding of relay 26 to the open contacts 21b and 21c. Relay 14 operated disconnects the tip and ring circuit of the calling subscriber's loop from the inductance coil 22 and pulsing relay 23 which releases. The dial tone circuit through condensers 36 and 37 is also disconnected from the calling subscriber's loop. By closing contacts 14c and 14d relay 14 connects the subscriber loop to conductors 101 and 106 which extend through the windings of relays 17 and 18 to the first selector. When relay 23 releases, it in turn releases relay 46 by opening contact 23b. Relay 46 in turn releases relay 15 by opening contact 46b. The release of relay 15 performs no useful function at this time.

The talking battery circuit for the calling subscriber's station at the present time may be traced from battery through the lower winding of relay 58, and since relay 57 is operated, as the called subscriber's loop is closed, through contact 57b, contact S1a, contact 51b, conductor 106, resistance 38 and the winding of relay 18 in parallel, contact 14d, conductor 12, contact LF1b, lower loop conductor, left-hand coil of inductance 10, left-hand contact of the receiver hook, transmitter 9 and dial contact 8c to two parallel branches to ground. One of the two parallel branches extends through the winding of coin magnet 7 and contact 6 to ground. The other extends through the top loop conductor, contact LF1a, conductor 11, contact 14c, resistance 35 and the winding of relay 17 in parallel, conductor 101, contact 51d, contact S1b, contact 57d and the top winding of relay 58 to ground. It will be noted that the winding of relay 17 is in one of the parallel branches with ground connected to its right-hand terminal. For this condition the armature of relay 17 is maintained in engagement with contact 17b under spring tension. The calling and called subscriber may now converse.

*Call not charged*

If the line current is not reversed relays 17, 51, 27, 55 and 54 will not operate and the circuit remains in a condition to return the coin when the calling party disconnects. On this type of call relay 14 does not operate, condensers 36 and 37 in the tip and ring leads are in the talking circuit and relay 23 and inductance 22 are connected in the battery and ground paths.

*Disconnect*

When the calling subscriber disconnects, the line finder is still held operated by ground through contact 20c. When the calling subscriber's loop is opened by the opening of the receiver switchhook contacts, relay 58 releases as its top and bottom windings are connected in the loop circuit as heretofore traced. The release of relay 58 opens contact 58a, in turn releasing relay 59. The opening of contact 59a opens the ground connection supplied through contact S1c to parallel branches. One branch extends through contact 56b and conductor 116 to the winding of relay 16 which releases. The other branch extends through conductor 117, contact 27d and conductor 70 to the winding of relay 14 which releases. Relay 25 operates over a path from ground through contact 126a in the alarm circuit, contact 20g, contact 25b, winding of relay 25, conductor 79 and contact 16g to battery. The operation of relay 25 establishes a circuit from battery through contact 25f, filament of lamp 29 in parallel with resistance 43 and the winding of relay 134 in the alarm circuit to ground, lighting lamp 29. A circuit may be traced from battery in the alarm circuit through conductor 133, contact 20h, conductor 132, winding of relay 126 in the alarm circuit through interrupter 127 to ground operating relay 126 intermittently, alternately grounding conductors 124 and 125 through contacts 126a and 126b, respectively, for equal intervals which may, for instance, be of one-half second duration each. This feature is employed to cause the coin control battery of this circuit, to be described later, to be connected to the subscriber's line for one-half second duration and thereby insure sufficient time for proper operation of the coin control magnet. Relay 25 operated locks through its contact 25a and contact 20f to ground. Relay 25 operated also establishes a circuit from battery through contact 16b, conductor 76, contact 20b, contact 25c, winding of relay 21 and contact 126b to ground when interrupter 127 is in proper position.

If the called subscriber should hang up before the calling subscriber, relay 57 releases, reversing the polarity of the battery to the tip and ring conductors of the calling loop. In response to this, since battery is now connected to the right-hand terminal of relay 17, the armature of relay 17 is actuated to engage contact 17a. The armature of relay 18 is actuated due to its spring tension to engage contact 18b. This establishes a short circuit around the winding of relay 51. It will be recalled that relay 51 was locked over a path from battery through resistance 66, winding of relay 51, contact 51h, conductor 105 and contact 20f to ground. With contacts 17a and 18b closed, a path may be traced from battery through resistance 66, contact 54b, contact 55c, conductor 115, contact 17a, contact 18b and contact 20f to ground. This path passes through junctions with the upper and lower terminals of the winding of relay 51 short-circuiting the winding. The resistance 66 is a current limiting resistance for the short-circuit condition. Relay 51 releases in turn releasing relay 55 by opening contact 51g. The winding of relay 17 and resistance 35 are now short-circuited over a path from junction 91 of the left-hand terminal of the resistance and upper terminal of the winding through conductor 102, contact 54d, contact 51f to junction 90 which connects through conductor 101 to terminal 89 of the right-hand terminal of resistance 35 and the lower terminal of the winding of relay 17. The armature of relay 17 is actuated under spring tension to engage its contact 17b. With the armature of relay 18 in engagement with its contact 18a and relay 55 released, the locking path from battery through resistance 64, winding of relay 54, contact 54c, conductor 105 to ground through contact 20f is shorted over a path from battery through resistance 64, contact 55b, conductor 114, contact 18a and contact 20f releasing relay 54. Resistance 64 is a current limiting resistance for this short-circuit condition. With relay 51 released the winding of relay 17 is again connected on the ground side of the line. If the calling party disconnects first, relays 51, 55 and 54 release when relay 20 releases in a manner to be described.

*Non-charge call*

On a non-charge call relay 27 is in the unoperated condition. When the calling station disconnects relay 23 releases, releasing relay 46 and relay 15, and opens the loop to succeeding switches. After an interval, ground is removed from the sleeve circuit S1c of the selector. From this point forward the circuit functions as described in the preceding paragraph except that relays 51, 55 and 54 will not have been operated.

*Coin control*

The operation of coin control relay 21 connects positive or negative coin battery to the line to collect or return the coin. If the coin is to be collected, positive battery is connected through the filament of lamp 28, contact 27*c*, winding of relay 26, contacts 21*b* and 21*c* in parallel, conductors 73 and 72 through the tip and ring circuit of the calling subscriber loop in parallel, through the winding of the coin magnet and contact 6 to ground. This actuates the coin mechanism in a direction to collect the coin. If the coin is to be returned, negative coin battery is connected through the filament of coin return lamp 128, contact 21*f*, contact 27*e*, winding of relay 26 and contacts 21*b* and 21*c* in parallel over the same path to return the coin. Relay 26 operates in series with the coin magnet and remains operated as long as the coin collect or coin return battery is connected to the line.

The positive coin collect battery, if the coin is to be collected, or negative coin return battery, if the coin is to be returned, when connected to the line should dispose of the coin, but the magnet will hold ground on the tip of the line as long as it is operated. The operation of relay 26 connects battery through contact 26*a* to the winding of relay 24 to hold relay 24 operated, since the operating circuit of relay 24 is opened when relay 21 operates. When interrupter relay 126 is released and contact 126*b* is opened to disconnect ground, relay 21 releases, opening contacts 21*b* and 21*c*, removing the coin collect or coin return current, releasing relay 26 and holding relay 24 operated. At the next closure of ground through contact 126*b*, relay 21 reoperates connecting coin collect or coin return battery again to the line. The coin should have been collected or returned on the first application of potential which upon the removal of the positive or negative potential restores the coin magnet to normal and no current should flow through the winding of relay 26 on the subsequent application of coin potential.

*Release of circuit*

It was explained in the foregoing that before the coin is disposed of when relay 21 is operated, relay 26 is operated to ground through contact 6 in the coin control device. The coin should be disposed of on the first operation. If the coin is not disposed of relay 26 will reoperate each time ground from contact 126*b* operates relay 21. In this event, battery from contact 26*a* will hold relay 24 which in turn will hold relay 20. Thereupon battery will be supplied through contact 16*b*, conductor 76, contact 20*b*, contact 25*d*, filament of lamp 29 and resistance 43 in parallel through the winding of relay 134 to ground operating an alarm through contact 134*a* after a predetermined interval in a well-known manner.

After the coin is disposed of the ground through contact 6 is not available. Relay 26, therefore, does not reoperate when relay 21 reoperates. Since battery is disconnected from the winding of relay 24 both at open contact 21*e*, relay 21 being operated and at open contact 26*a*, relay 26 being unoperated, relay 24 releases. This in turn releases relay 20 by disconnecting battery through contact 24*a* from the winding of relay 20. The release of relay 20, by opening contact 20*c*, disconnects ground from the sleeve of the line finder and releases relays 21 and 25 by opening contacts 20*b* and 20*f*, respectively. The opening of contact 20*f* also releases relay 27 which was locked through contacts 27*b* and 20*f* and releases relays 55 and 54, and releases also relays 27, 55 and 54 if operated at the time. The release of relay 20 also reconnects battery through contact 16*b* and contact 20*a* to the path through resistance 42 and the bottom winding of relay 53 to restore the condition prevailing at the outset as relay 21 releases to connect conductors 73 and 72 to the top and bottom windings of relay 53, respectively. The opening of contact 20*b* removes battery supplied through contact 16*b*, filament of lamp 29 and resistance 43 in parallel and the winding of relay 134 in the alarm circuit to ground. The opening of contact 20*h* opens the path through the winding of interrupter relay 126 in the alarm circuit. With relay 21 released the path through the top and bottom windings of relay 53 is reestablished. Thus the circuit is restored to the normal idle condition.

*Calls to special service operator*

On calls to a special service operator, the selector level trunk is so arranged that battery and ground are reversed immediately when the operators anwers. This causes the circuit to function as described in the foregoing under the heading "Coin Deposited." If coin collect current is supplied to the line from the trunk, the armature of relay 17 remains in engagement with contact 17*b* and the armature of relay 18 is actuated under spring tension to engage contact 18*b*. If coin return current is applied to the line from the trunk, the armature of relay 17 engages contact 17*a* and the armature of relay 18 remains operated. Neither relay performs a useful function at this time.

On a rering by the special service operator, relay 17 may operate on ringing current. If relay 17 remains operated due to earth potential with relay 18 released it shunts down relay 51. Relay 51 released, releases relay 55 and short-circuits relay 17. The earth potential which may have held relay 17 will not operate it after the short circuit is removed. The release of relay 51 also reverses the tip and ring operating relay 18 which shunts down relay 54.

*Preventing double connections*

Double connections on line terminals of line finders associated with presently known coin box trunks occur during momentary opening of the sleeve holding ground from the coin box trunk. During the instant that the ground is opened, a battery connected to the sleeve from the present coin box trunk is left unguarded. The unguarded battery has been found to cause double connections under certain conditions. This is prevented in the arrangement of coin box trunk herein by a redesign of the sleeve circuit of the trunk and its associated connections which make it impossible to produce an unguarded battery condition on the sleeve at any instant during operation.

When double connections occur, frequently the call is completed through the first connection while the second connection finds the line busy as a result of the first connection. One coin trunk attempts to collect the coin while the second attempts to return it. If the second is successful revenue is frequently lost. This is prevented in the arrangement herein.

What is claimed is:

1. In a telephone system, in combination, lines and stations, a subscriber's prepay coin station circuit connected to one of said lines, said station circuit comprising a coin control mechanism, a switchhook and a dial, means including a line finder and a coin control trunk circuit cooperatively responsive to said mechanism, said switchhook and said dial for establishing connections between said one line and a called subscriber's line, a sleeve connection in said line finder, a sleeve circuit in said coin trunk connectable to said sleeve connection, a first relay control in said trunk for said sleeve circuit, said first control operable in response to the seizure of said trunk by said line finder to connect direct ground from said sleeve circuit to said sleeve connection, and a second relay control in said trunk responsive to the progress of said call through a succeeding stage, for connecting a second direct ground in said trunk in parallel with said first ground continuously until after said prepay circuit disconnects, to prevent double connections and loss of revenue.

2. In a telephone system, in combination, lines and stations, a subscriber's prepay coin station circuit connected to one of said lines, said station circuit comprising a coin control mechanism, a switchhook and a dial, means including a line finder, a coin control trunk circuit, a selector and a connector all cooperatively responsive to said mechanism, said switchhook and said dial for establishing connections between said one line and a called subscriber's line, a sleeve connection in said line finder, a sleeve circuit in said coin trunk having a first and a second parallel branch, a first and a second relay control for said branches respectively in said trunk, said first relay responsive to the seizure of said trunk to connect direct ground to said first branch, the second of said branches extending through continuity contacts of said second relay and through a sleeve connection of said selector to direct ground in said connector responsive to the seizure of a direct ground connected through a make contact of said continuity contacts to said second branch, responsive to the depositing of a coin in said coin control mechanism, to prevent double connections and loss of revenue.

3. In a telephone system, in combination in a mechanical switching coin trunk circuit, a tip circuit, a ring circuit, a first polar relay in series in said tip circuit, a second polar relay in series in said ring circuit, a third tip and ring reversing relay, a fourth bridge relay having a first winding connected to ground and a second winding connected to battery bridged across said tip and ring circuit when said trunk is seized, a sleeve circuit having a first and a second parallel branch, a fifth and a sixth relay control for said branches, respectively, said first branch normally open at a contact of said fifth relay, said second branch normally extending through break contacts of a make-before-break contact combination of said sixth relay, connections between said fourth relay and said fifth relay responsive to the seizure of said trunk to connect a first direct ground to said sleeve, through said first branch, said polar relays and said reversing relay selectively responsive to successive steps in the progress of a call through said trunk, and a second direct ground connectable through the make contact of said contact combination to said second branch in parallel with said first ground, responsive to the deposit of a coin in coin mechanism connected to said trunk, to supplement said first ground to prevent double connections.

4. In a telephone system, a coin trunk circuit for a mechanical system, said trunk having a sleeve circuit, said sleeve circuit having a first and a second parallel branch, said first branch terminating at an open contact of a first relay in said trunk when said trunk is idle, said second branch extending through contacts of a second relay in said trunk when said trunk is idle, first relay controls for said first relay in said trunk responsive to the seizure of said trunk to directly ground said first branch through said first relay, second relay controls for said second relay in said trunk responsive to the deposit of a coin in a coin station circuit connected to said trunk to directly ground said second branch at said contacts of said second relay, said controls responsive to the disconnection of said coin station circuit from said trunk to restore said branches to their condition when idle.

5. In a telephone system, a first coin-controlled subscriber telephone circuit, a line finder, a coin trunk circuit, a selector circuit, a connector circuit and a second subscriber telephone circuit, an operable telephone path extending between said coin-controlled subscriber circuit and said second subscriber circuit through said line finder, said coin trunk, said selector circuit and said connector circuit, said path establishable dependent on the deposit of a coin in coin control mechanism connected to said coin-controlled circuit, a sleeve circuit in said trunk circuit, said sleeve circuit extending from a sleeve of said line finder, said sleeve circuit comprising two parallel branches and devoid of other branches, one of said branches extending to the open contacts of a first relay and the other of said branches extending through continuity contacts of a second relay, first relay controls in said trunk, responsive to the seizure of said trunk by said line finder, to directly ground said first branch through said contacts of said first relay, second relay controls in said trunk responsive to the deposit of a coin in said mechanism, for operating said second relay so as to terminate said second branch directly in ground at said continuity contacts of said second relay, to prevent double connections and loss of revenue.

References Cited in the file of this patent

UNITED STATES PATENTS

| Number | Name | Date |
|---|---|---|
| 2,529,410 | Newstedt | Nov. 7, 1950 |